(12) United States Patent
Motik et al.

(10) Patent No.: US 11,409,698 B2
(45) Date of Patent: Aug. 9, 2022

(54) PARALLEL MATERIALISATION OF A SET OF LOGICAL RULES ON A LOGICAL DATABASE

(71) Applicant: Oxford University Innovation Limited, Oxford (GB)

(72) Inventors: Boris Motik, Oxford (GB); Yavor Nenov, Oxford (GB); Ian Horrocks, Oxford (GB)

(73) Assignee: OXFORD UNIVERSITY INNOVATION LIMITED, Oxford (GB)

( * ) Notice: Subject to any disclaimer, the term of this patent is extended or adjusted under 35 U.S.C. 154(b) by 83 days.

(21) Appl. No.: 17/025,192

(22) Filed: Sep. 18, 2020

(65) Prior Publication Data

US 2021/0004351 A1 Jan. 7, 2021

Related U.S. Application Data

(63) Continuation of application No. 15/033,583, filed as application No. PCT/GB2014/053230 on Oct. 30, 2014, now Pat. No. 10,817,467.

(30) Foreign Application Priority Data

Oct. 31, 2013 (GB) .................................. 1319252
Sep. 12, 2014 (GB) .................................. 1416133

(51) Int. Cl.
  *G06F 16/00* (2019.01)
  *G06F 16/11* (2019.01)
  (Continued)

(52) U.S. Cl.
  CPC ...... *G06F 16/122* (2019.01); *G06F 16/24569* (2019.01); *G06F 16/9024* (2019.01); *G06N 5/04* (2013.01)

(58) Field of Classification Search
  CPC ............. G06F 16/122; G06F 16/24569; G06F 16/9024; G06N 5/04
  See application file for complete search history.

(56) References Cited

U.S. PATENT DOCUMENTS 5,560,006 A    9/1996 Layden
6,438,562 B1 * 8/2002 Gupta ................. G06F 16/2272
                                                         707/696

(Continued)

FOREIGN PATENT DOCUMENTS

EP    1990741 A1    11/2008
WO   2013137903 A1   9/2013

OTHER PUBLICATIONS

Summons to Attend Oral Proceedings issued in European Appln. No. 14793259.4 mailed Mar. 20, 2020.
(Continued)

*Primary Examiner* — Shew Fen Lin
(74) *Attorney, Agent, or Firm* — Rossi, Kimms & McDowell LLP

(57) ABSTRACT

A computer-implemented method of providing a materialisation of a set of logical rules on a logical database comprising a set of logical facts. Each of a plurality of parallel processing threads performs the following steps. A logical fact that has not previously been received by any thread is received by the thread. By applying any of the logical rules to the received logical fact and/or any of the logical facts received by any thread prior to the received logical fact, the thread determines whether a new logical fact is implied, and if so the new logical fact is added to the set of logical facts. The thread then repeats the above steps on any further logical facts in the set of logical facts that have not previously been received by any thread. When all threads are waiting for a new logical fact, the method has completed.

17 Claims, 4 Drawing Sheets

(51) Int. Cl.
*G06F 16/901* (2019.01)
*G06F 16/245* (2019.01)
*G06N 5/04* (2006.01)

(56) References Cited

U.S. PATENT DOCUMENTS

| | | | |
|---|---|---|---|
| 7,809,752 | B1 | 10/2010 | Kozyrczak |
| 2005/0055330 | A1 | 3/2005 | Britton |
| 2006/0112121 | A1* | 5/2006 | McKenney ......... G06F 16/9024 |
| 2006/0235837 | A1 | 10/2006 | Chong |
| 2007/0038651 | A1 | 2/2007 | Bernstein |
| 2007/0194957 | A1 | 8/2007 | Watanabe |
| 2010/0138698 | A1 | 6/2010 | Angele |
| 2010/0169966 | A1 | 7/2010 | Yalamanchi |
| 2010/0217784 | A1 | 8/2010 | Carter |
| 2011/0082829 | A1* | 4/2011 | Kolovski ............ G06F 16/367 |
| | | | 706/55 |
| 2011/0125696 | A1 | 5/2011 | Wu |
| 2012/0271787 | A1 | 10/2012 | Lee |
| 2013/0262443 | A1 | 10/2013 | Leida |
| 2013/0346354 | A1* | 12/2013 | Mizell ................. G06N 5/025 |
| | | | 706/47 |
| 2014/0156587 | A1 | 6/2014 | Momtchev |
| 2014/0330801 | A1* | 11/2014 | Kaldewey .......... G06F 16/2255 |
| | | | 707/698 |
| 2014/0351195 | A1* | 11/2014 | Mizell ................... G06N 5/04 |
| | | | 706/47 |

OTHER PUBLICATIONS

"Microsoft SQL Server Development Customer Advisory Team: Load 1TB in less than 1 hour." Dec. 13, 2007. 5 pages. Web Mar. 6, 2020. URL:https://web.archive.org/web/20071213231828/http://blogs.msdn.com/sqlcat/archive/2006/05/19/602142.aspx.

GB Patent Office, "Search Report from GB Application No. 1319252.1 dated Mar. 31, 2014", dated Mar. 31, 2014, pp. 1-4, Published in: GB.

GB Intellectual Property Office, "Search Report from GB Application No. 1319252.1 dated Jan. 23, 2015", dated Jan. 23, 2015, pp. 1-2, Published in: GB.

International Searching Authority, "International Search Report and Written Opinion from PCT Application No. PCT/GB2014/053230 dated Apr. 29, 2015", dated Apr. 29, 2015, pp. 1-14, Published in: WO.

"Thread (computing)", "retrieved from Internet at: http://en.wikipedia.org/w/index.php?tille=Thread_%28computing%J9&oldid=578888975 [retrieved on Apr. 15, 2013]", Oct. 26, 2013, pp. 1-14.

Urbani et al., "DynamiTW: Parallel Materialization of Dynamic RDF Data", "The Semantic Web—ISWC 2013. 12th International Semantic Web Conference Proceedings", pp. 657-672, Publisher: Springer-Verlag.

Volz et al., "Incremental Maintenance of Materialized Ontologies", "Lecture Notes in Computer Science", Jan. 1, 2003, pp. 1-19.

Representing Facts and Rules in RDF (Graham Klyne) (Year: 2002).

Incremental maintenance of materialized views with outer joins (Anisoara Nica, Sybase) (Year: 2011).

Office Action issued in U.S. Appl. No. 15/033,583 dated Dec. 20, 2018.

Office Action issued in U.S. Appl. No. 15/033,583 dated Jul. 12, 2019.

Office Action issued in U.S. Appl. No. 15/033,583 dated Mar. 23, 2020.

Notice of Allowance issued in U.S. Appl. No. 15/033,583 dated Jul. 1, 2020.

Grosof et al. "Description Logic Programs: Combining Logic Programs with Description Logic". World Wide Web Conference, 2003.

* cited by examiner

PARALLEL MATERIALISATION OF A SET OF LOGICAL RULES ON A LOGICAL DATABASE

This application is a continuation of U.S. patent application Ser. No. 15/033,583, filed Apr. 29, 2016, which claims priority to International Patent Application No. PCT/GB2014/053230 filed on Oct. 30, 2014, which claims priority to GB Patent Application Nos. 1319252.1 filed on Oct. 31, 2013 and 1416133.5 filed Sep. 12, 2014.

FIELD OF THE INVENTION

The present invention concerns the materialisation of a set of logical rules on a logical database, such as a Resource Description Framework (RDF) database. More particularly, but not exclusively, the invention concerns computer-implemented methods of providing the materialisation of a set of logical rules on a logical database that are particularly amenable to parallel execution. The invention also concerns methods of storing data in computer memory when executing such methods.

BACKGROUND OF THE INVENTION

Linked data on the Internet is commonly stored in the form of logical databases containing logical "facts", such as RDF databases. Data in an RDF is stored in "triples" <subject, predicate, object>, which is intuitively intended to record that the subject is related to the object according to the relation given by the predicate. So for example, an RDF database containing data relating to television might have person_X, person_Y and programme_Z as items that can be subjects and/or objects, and relations such as appeared_in and was_directed_by as predicates, allowing such triples as <person_X, appeared_in, programme_Z> and <programme_Z, was directed_by, person_Y> to be stored.

A feature of RDF databases is that the items used as subjects and objects, and the relations used as predicates, are represented using standardised Uniform Resource Identifiers (URIs), which can be used by any creator of a database. So for example, the following URIs are provided for use in RDF databases about wine:
http://www.w3.org/TR/2004/REC-owl-guide-20040210/wine#Merlot
http://www.w3.org/TR/2004/REC-owl-guide-20040210/wine#MerlotGrape
http://www.w3.org/TR/2004/REC-owl-guide-20040210/#winemadeFromGrape
As the same URIs can be used in different databases, this allows different databases to be easily combined.

RDF databases can also have associated with them datalog rules, which describe how new data can be derived from existing data in an RDF database. ("Datalog" is a declarative logical programming language, which is a subset of the logical programming language Prolog.) For example, in the example above of a database about television, a rule could be:
<X, appeared_in, Y> and <Y, was_directed_by, Z>→<Z, has_directed, X>
Thus, in our example above this allows the new triple <person_Y, has_directed, person_X> to be derived.

In order to be able to answer queries over an RDF database (which may have been obtained by combining multiple existing RDF databases from different sources) and datalog rules, it is common for a database to undergo "materialisation", by which all triples that can be derived from the existing data and rules are added to the database. While materialisation is computationally intensive, it is nevertheless commonly used. A well-known method of materialisation is the "seminaïve algorithm", as described in S. Abiteboul, R. Hull, V. Vianu, *Foundations of Databases*, Addison Wesley, 1995.

In order to improve the speed of materialisation, it is common for it to be performed using parallel processing. However, a disadvantage of the seminaïve algorithm, and of other known methods of materialisation, is that they cannot be efficiently performed by parallel processing, due to need for threads to wait for others to complete before they can continue processing. Another disadvantage is that the memory use by such methods does not support parallel processing.

It is also common for RDF databases to use an "equality" predicate owl:sameAs in facts, terms and so on. Intuitively, an equality predicate indicates that a subject and object in a fact refer to the same underlying "thing", i.e. that they are equal. For example, facts such as <USA, owl:sameAs, US> and <US, owl:sameAs, America> that indicate that the different terms USA, US and America all refer to the same thing (country). A rule using the predicate might for example be:
<Obama, presidentOf, x>→<x, owl:sameAs, USA>
which indicates that if Obama is the president of something, that something must be the same as the USA, even if a different term (such as US or America) is used for it. A corresponding predicate owl:differentFrom to indicate that a subject and object do not refer to the same underlying thing may also be used.

A well-known technique for handling databases incorporating equality predicates is rewriting, in which a representative term for a set of equal terms is selected, and the other terms in the set are replaced with the selected representative. However, a problem with known techniques is that they cannot be efficiently performed using parallel processing.

The present invention seeks to mitigate the above-mentioned problems. In particular, the present invention seeks to provide improved computer-implemented methods of materialisation which are amenable to parallel processing, and methods of storing data in computer memory when executing such methods. In addition, the present invention seeks to provide improved computer-implemented methods of materialisation of databases incorporating equality predicates which are amenable to parallel processing, and computer-implemented methods of answering queries on materialised databases incorporating equality predicates.

SUMMARY OF THE INVENTION

In accordance with a first aspect of the invention, there is provided a computer-implemented method of providing a materialisation of a set of logical rules on a logical database comprising a set of logical facts, wherein each of a plurality of parallel processing threads performs the following steps:
1) receiving a logical fact from the set of logical facts, wherein the received logical fact has not previously been received by any thread;
2) determining if a new logical fact is implied, by applying any of the logical rules to the received logical fact and/or any of the logical facts received by any thread prior to the received logical fact;
3) in the case that a new logical fact is implied, adding the new logical fact to the set of logical facts;

4) determining if there are further logical facts in the set of logical facts that have not previously been received by any thread; and 4a) in the case that there are further logical facts, repeating steps 1 to 4 of the method;

4b) in the case that there are no further logical facts, waiting until a new logical fact is added to the set of logical facts, and when a new logical fact is added, repeating steps 1 to 4 of the method;

wherein when all threads are waiting for a new logical fact to be added, the set of logical facts is provided as the materialisation of the set of logical rules on the logical database.

In this way, each thread is able to receive a logical fact from the set of logical facts, and then finds any new logical facts implied by applying the logical rules to the received logical fact or any previously received logical facts. Any new facts are added to the set of logical facts. As any thread is only considering its received logical fact or any previously received facts, it does not matter if any new logical facts are added to set of logical facts, as these would not be processed by the thread while considering the current logical fact. This allows all the threads to process the logical facts in parallel, asking for a new logical fact when the processing of the current logical fact has been completed. If any threads find that there are no further logical facts in the set of logical facts, they wait until new logical facts are added by another thread, at which point they can begin processing the newly added facts. Finally, if all threads are waiting it is not possible for any new logical facts to be added, and so the materialisation process has completed.

Advantageously, step 4b of the method further comprises checking if the number of waiting threads is the same as the number of total threads, and if so providing notification to all threads that the materialisation is complete. This provides a particularly convenient way of determining if the processing has completed and terminating all threads. The number of waiting threads may be stored in a global variable, which is incremented/decremented by a thread when it begins/stops waiting respectively.

Advantageously, in step 3 each thread provides notification to any waiting threads that a new logical fact has been added. In this case, preferably in step 4b, the thread waits for notification from another thread that a new logical fact has been added. This means each thread does not need to monitor the set of logical facts for any additions.

Advantageously, in step 1 the new logical fact is received from an iterator which selects the new logical fact from among the logical facts in the set of logical facts that have not previously been selected by the iterator. The iterator may return logical facts in the order they are added to the set of logical facts. Alternatively, the iterator may return logical facts in a different order from the order they are added to the set of logical facts.

In step 2 the determination may be performed using index nested loops.

The logical database may be an RDF database. In this case, the logical facts will be RDF triples. The set of logical rules may be a datalog program. Alternatively, the logical rules may be ontologies, data dependencies, or anything other type of rule that can be applied to logical facts in a logical database.

Preferably, prior to performing any steps in the threads, the set of logical rules is pre-processed to determine a join ordering.

Advantageously, the set of logical facts includes at least one logical fact incorporating an equality predicate indicating that two constants are equal, a mapping of constants to representative constants is maintained, and the method includes the steps of:

selecting a representative constant from the two constants;

updating the mapping to map the other constant to the representative constant;

rewriting logical facts in the set of logical facts using the mapping to replace occurrences of the other constant with the representative constant. This allows sets of logical facts that include constants that are equal to be efficiently processed, as by selecting one constant as the representative, the representative constant can be used in all logical facts meaning that multiple logical facts for each equal constant are not required. Advantageously, when the representative constant is selected the other constant is added to a queue of constants, and wherein the logical facts are rewritten by replacing occurrences they contain of the constants in the queue of constants with their representative constants. This is a convenient method for keeping a list of the constants that need to be replaced in the logical facts with their representative constants. Advantageously, the rewriting of the logical facts is performed in a parallel processing thread.

Preferably, the method further comprises the step of rewriting the logical rules in the set of logical rules using the mapping to replace occurrences of other constants with their representative constants. Advantageously, the rewriting of the logical rules is performed in a parallel processing thread.

Preferably, the method further comprises the steps of:

determining if a logical rule from the set of logical rules contains any constants that are mapped by the mapping to representative constants; and in the case that a logical rule contains constants that are mapped, adding the logical rule to a queue of logical rules and wherein the logical rules that are rewritten are the logical rules in the queue of logical rules. Preferably the steps are performed when all parallel processing threads have finished processing.

Advantageously, the method further comprising the steps of:

determining if a logical fact from the set of logical facts contains any constants that are mapped by the mapping to representative constants; and in the case that a logical fact contains constants that are mapped, adding a marker to the logical fact. This means that when a logical fact containing constants that are mapped is implied by the logical rules that were already present in the set of facts, it does not need to be determined again if it contains any constants that are mapped. Advantageously, in step 1) a logical fact is received from the set of logical facts only if a marker has not been added to the logical fact.

In accordance with a second aspect of the invention, there is provided a method of storing data in computer memory when performing any method described above, wherein the computer memory comprises a table of logical facts, and wherein each logical fact in the set of logical facts is stored as an entry in the table of logical facts. This provides a particularly convenient data structure in which to store the logical facts, that allows parallel processing by the threads while minimising concurrency issues. In the case that the logical database is an RDF database, the table will be a table of RDF triples.

Advantageously, each entry in the table of logical facts further comprises at least one pointer for each logical fact to a second logical fact in the table of logical facts sharing one or more properties with the first logical fact. The pointers define linked lists of logical facts, which can be used to efficiently find logical facts in the list. In the case the logical facts are RDF triples, the pointers may be between logical facts sharing subjects, predicates and/or objects. The linked lists defined by the pointers may group the logical facts on a further property of the logical fact.

Advantageously, the computer memory further comprises at least one index for locating a logical fact in the table of logical facts from one or more properties of the logical fact. The at least one index can be used to efficiently find logical facts in the list. In the case the logical facts are RDF triples, the indexed properties of the logical facts may be subjects, predicates and/or objects.

At least one index may be a hash table. Advantageously in that case, when the number of filled buckets in the hash table exceeds a pre-determined threshold, the hash table is resized. The threshold may be 70% of buckets being filled, for example. Advantageously, the resizing is performed by each thread that attempts to access the index while it is being resized. This means the resizing can be done by any thread that would in any case not otherwise be able to continue processing (as it requires use of the index being resized in order to do so), while allowing threads that do not need to use the index to continue processing.

Advantageously, each entry in the table of logical facts comprises a status flag indicating whether the logical fact in the entry has been added to the at least one index. This allows new logical facts to be added to table and indexed, without requiring all other threads to stop processing while that is occurring. Preferably, the status flag indicates when the new logical fact has been added to all relevant indexes.

Advantageously, each thread has associated with it a reserved area of the table of logical facts, and each thread adds logical facts only to its associated reserved area. This allows threads to add logical facts to the table in parallel without concurrency issues arising due to the same area of the table being used by more than one thread.

In accordance with a third aspect of the invention, there is provided a computer system arranged to perform the steps of any method described above.

In accordance with a fourth aspect of the invention, there is provided a computer program product arranged, when executed on a computer system, to perform the steps of any method described above.

In accordance with a fifth aspect of the invention, there is provided a method of storing data in computer memory for a logical database comprising a set of logical facts, wherein the computer memory comprises a table of logical facts, each logical fact in the set of logical facts is stored as an entry in the table of logical facts, and wherein each entry in the table of logical facts further comprises at least one pointer for each logical fact to a second logical fact in the table of logical facts sharing one or more properties with the first logical fact.

This provides a particularly convenient data structure in which to store the logical facts, in which triples can be efficiently found, and that allows parallel processing by the threads while minimising concurrency issues. The pointers define linked lists of logical facts, which can be used to efficiently find logical facts in the list. The data structure is particularly advantageous when materialisation of the logical database is being performed, but is also advantageous for storing new logical facts in the logical database, querying the logical database, and performing other operations on the logical database.

In the case that the logical database is an RDF database, the table will be a table of RDF triples. In this case, the pointers may be between logical facts sharing subjects, predicates and/or objects. The linked lists defined by the pointers may group the logical facts on a further property of the logical fact. Preferably, there are pointers that define sp-lists connecting triples with the same subject, grouped (but not necessarily sorted) by their predicate. Preferably, there are pointers that define op-lists connecting triples with the same object, grouped (but not necessarily sorted) by their predicate. Preferably, there are pointers that define p-lists connecting triples with the same predicate (without any further grouping).

Advantageously, the computer memory further comprises at least one index for locating a logical fact in the table of logical facts from one or more properties of the logical fact. The at least one index can be used to efficiently find logical facts in the list. In the case the logical facts are RDF triples, the indexed properties of the logical facts may be subjects, predicates and/or objects. Preferably, when there are pointers that define sp-lists, there is an index that associates each subject with the head (i.e. first triple) of the first sp-list with that subject. Preferably, there is also an index that associates each pair of subject and object with the first triple in the sp-list with that subject and object. Preferably, when there are pointers that define op-lists, there is an index that associates each object with the head of the first op-list with that object. Preferable, there is also an index that associates each pair of predicate and object with the first triple in the op-list with that predicate and object. Preferably, when there are pointers that define p-lists, there is an index that associates each predicate with the head of p-list with that predicate. Preferably, there is an index which associates each triple of subject, predicate and object with the triple in the table of logical facts with that subject, predicate and object.

At least one index may be a hash table. Advantageously in that case, when the number of filled buckets in the hash table exceeds a pre-determined threshold, the hash table is resized. The threshold may be 70% of buckets being filled, for example. Advantageously, the resizing is performed by each thread that attempts to access the index while it is being resized. This means the resizing can be done by any thread that would in any case not otherwise be able to continue processing (as it requires use of the index being resized in order to do so), while allowing threads that do not need to use the index to continue processing.

Advantageously, each entry in the table of logical facts comprises a status flag indicating whether the logical fact in the entry has been added to the at least one index. This allows new logical facts to be added to table and indexed, without requiring all other threads to stop processing while that is occurring. Preferably, the status flag indicates when the new logical fact has been added to all relevant indexes.

Advantageously, each thread has associated with it a reserved area of the table of logical facts, and each thread adds logical facts only to its associated reserved area. This allows threads to add logical facts to the table in parallel without concurrency issues arising due to the same area of the table being used by more than one thread.

In accordance with a sixth aspect of the invention, there is provided a computer system arranged to perform the steps of any method described above.

In accordance with a seventh aspect of the invention, there is provided a computer program product arranged, when executed on a computer system, to perform the steps of the any method described above.

In accordance with an eighth aspect of the invention, there is provided a computer-implemented method of answering a query over a set of logical facts obtained using a method described above where the set of logical facts includes at least one logical fact incorporating an equality predicate indicating that two constants are equal, comprising the steps of:

rewriting the query using the mapping to replace occurrences of other constants with their representative constants;

determining answers to the rewritten query on the set of logical facts; and expanding the answers by replacing representative constants in the answers with other constants that map to them.

This allows the query to be efficiently answered, as only the representative constants need to be considered. The query may be a SPARQL query.

Preferably, the method further comprises the step of duplicating an answer in the case that another answer to the query is a constant that is a representative of a set of equal constants. This allows answers that are repeated when there are multiple equal constants to be correctly provided.

Preferably, the step of determining answers to the rewritten query comprises the substeps of:

determining the answers without evaluating any built-in functions;

expanding the answers by replacing representative constants in the answers with other constants that map to them; and evaluating any built-in functions. This allows built-in functions to be correctly handled.

In accordance with a ninth aspect of the invention, there is provided a computer system arranged to perform the steps of any of the methods described above.

In accordance with a tenth aspect of the invention, there is provided a computer program product arranged, when executed on a computer system, to perform the steps of any of the methods described above.

It will of course be appreciated that features described in relation to one aspect of the present invention may be incorporated into other aspects of the present invention.

DESCRIPTION OF THE DRAWINGS

Embodiments of the present invention will now be described by way of example only with reference to the accompanying schematic drawings of which.

DETAILED DESCRIPTION

Figure 1:
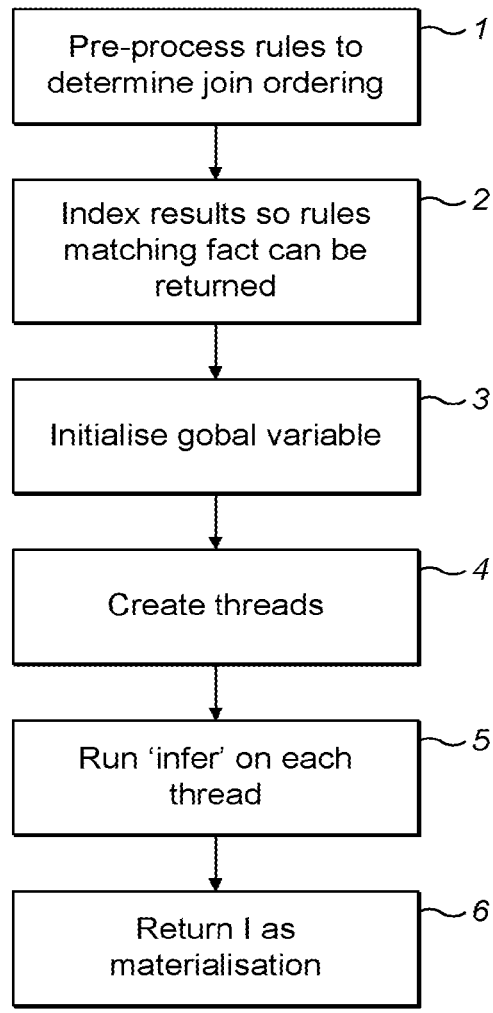
FIG. 1 is a flowchart showing an overall method of materialisation, in accordance with an embodiment of the invention.

There is now described a method of materialisation of a set of logical rules on a logical database in accordance with an embodiment of the invention. Following the logical perspective on databases described in S. Abiteboul, R. Hull, V. Vianu, *Foundations of Databases*, Addison Wesley, 1995, it is assumed that the database has countably many relation names, constants and variables. The following terminology is used. A "term" is a constant or variable. An "atom" is a relation applied to a set of terms, i.e. $R(t_1, \ldots, t_n)$. If the terms of an atom are all constants, it is a "fact". A "database instance" I is a set of facts. A (datalog) "rule" is of the form:

$B_1$ and ... and $B_n \rightarrow H$ where $B_1$ to $B_n$ are "body" atoms, and H is the "head" atom. Such a rule must be "safe", which means that every variable that occurs in the head atom H occurs in at least one body atom $B_i$. A (datalog) program P is a set of rules. A "substitution" σ is a partial mapping of variables to terms, and for any term, atom or rule A, Aσ is the result of replacing the variables in A with the terms given by the substitution, where defined.

Given the above definitions, the materialisation of a program P on a database instance I can be formally defined as follows. Given a rule r in P, let r(I) be the smallest set containing Hσ for every substitution σ such that for all i, $B_i\sigma$ is in I. Let P(I) be the union of all r(I); let $P^0(I)=I$, and let $P^i(I)$ be the union of $P^{i-1}(I)$ and $P(P^{i-1}(I))$. The union of $P^i(I)$ for all i is then the materialisation of P on I.

In order for the method to be performed, the database instance I must provide an interface that meets certain concurrency requirements. In other words, it must be possible to query and manipulate I using an interface in ways that are well-behaved when the operations are being performed in parallel. The requirements are as follows.

Adding a fact F to I is written I.add(F), and if F already occurs in I, I should not be changed (there is "eager duplicate elimination"). It must be possible to check at a particular instance whether F exists in I, and if not F becomes "committed" to I. (While this may seem unlikely to be an issue, it need not be possible to perform this check on a database where facts can be added in parallel.)

$facts_I$ is an iterator that provides in turn each fact in I; that is, $facts_I$.next automatically selects and returns a fact from I that has not yet been returned (or returns if there is no next fact to return). $facts_I$.hasNext returns true if there is a next fact to return, or false otherwise. The sequence in which facts in I are returned by $facts_I$ determines an ordering < on the facts. $I^{<F}$ is then defined as the set of facts F' in I for which F'<F (i.e. all facts "before" F), and $I^{<=F}$ is the set plus the fact F.

I.match(A, L, F) takes an atom A, Boolean value (i.e. true or false) L, and fact F, and returns an iterator it. If L is false, it returns each substitution σ for which Aσ is in $I^{<F}$. If L is true, it returns each substitution σ for which Aσ is in $I^{<=F}$. In other words, atom A describes a pattern which is matched against or $I^{<F}$ or $I^{<=F}$, depending on L. it.next returns the next substitution, and it.hasNext is true if there is a next substitution, and false if there is not.

To give an example of the above, suppose I contains:

R(a, b)<R(b, b)<R(c, c)<R(d, d)<R(e, e)

Then I.match(R(x, x), false, R(d, d)) returns an iterator that returns the substitutions {x→b} and {x→c}. In particular, R(a, b) is not matched because x cannot be substituted in R(x, x) to give R(a, b); R(d, d) is not matched because it is not in $I^{<R(d, d)}$; and R(e, e) is not matched for the same reason as R(d, d).

A flowchart of the overall method is shown in FIG. 1. First, the rules of the program P are pre-processed, to determine a join ordering (step 1). This pre-processing of the rules rearranges their body atoms so that they can be evaluated efficiently during the materialisation process.

In the present embodiment, the rules are obtained as described in B. N. Grosof, I. Horrocks, R. Volz, S. Decker, *Description Logic Programs: Combining Logic Programs with Description Logic*, World Wide Web Conference, 2003. This means that all atoms are of the form <t, rdf:type, C>, where rdf:type is a placeholder used to indicate that the object is not required (i.e. the atom is simply associating t to C), or of the form <t1, R, t1> with R not equal to rdf:type. This means hash algorithms can be used to associate each constant c with sets $H_1[c]$ and $H_2[c]$ of pairs of rules and body atom permutations. Given a rule r and permutation $\pi$, if the $\pi(i)$th body atom $B_{\pi(1)}$ of r is of the first form above, <r, $\pi$> is added to $H_1[C]$, otherwise it is added to $H_2[R]$.

The hash algorithms then provide an indexing of the rules, which can be used when required to retrieve the rules matching a fact (step 2). This is written P.rulesFor(F) (where F is a fact <s, p, o>, i.e. with subject s, predicate p and object o). In order to retrieve the rules, if p is rdf:type then $H_1[o]$ is iterated over, otherwise $H_2[o]$ is iterated over. In each case, for each pair <r, s> it is determined whether a substitution r exists for which $b_1(r)\tau$ is F. If so, the rule r matches the fact F and so is returned.

Next, global variables W, N, run and m are initialised (step 3). N is the total number of threads, so is set to and remains constant at that value. W is the number of "waiting" threads (i.e. threads that have paused while they await the completion of processing by other threads), and is initially set to 0. run is a Boolean variable that indicates whether threads are currently processing, and is initially set to be true. m is a mutex variable which protects a critical section of the processing performed by the threads. (A mutex is a token that can be acquired by only one thread at a time, and can be used to grant a thread exclusive access to certain parts of thread code. Once a thread acquires a mutex, the thread can release the mutex, wait for notification from other threads, and acquire the mutex again. Accordingly, a thread can signal other threads that are waiting for notification.) The other global values used are the database instance I, program P, and facts iterator $facts_I$.

The threads are then created, and local variables for the thread are initialised (step 4).

The procedure infer, which is shown in Procedure 1, is then run on each thread (step 5). This is described in more detail below. The procedure infer in each thread obtains the facts it operates on from the global iterator $facts_I$, and so in practice the threads share between them the facts from I.

Once the infer procedure has completed for each thread, the global variable I, i.e. the database instance with facts as added by the operation of the infer procedure in each of the threads, is returned as the materialisation of the program P on the (original) database I (step 6).

The infer procedure is now described, with reference to Procedure 1. As noted above, the infer procedure is run on each thread; uses global variable I (the database instance), P (the program), $facts_I$ (the iterator over facts in I), N (the total number of threads), and W (the number of waiting threads); and uses local variables run (indicating whether it is running or waiting), and m (a mutex variable).

As can be seen, infer iterates over the facts in I, and matches the relevant rules (line 2 to 6). In particular, after retrieving a fact F from I (line 2), each rule r in P, permutation $\pi$ of its body atoms, and substitution $\sigma$ that unifies F with the body atom $b_{\pi(1)}$ (r) is retrieved. The substitution $\sigma$ defines a partial instantiation of r (i.e. a portion of the variables of r are replaced with constants), and then a further procedure evaluate shown in Procedure 2 matches the remaining atoms. The procedure evaluate is described in more detail below, but in essence uses index nested loops. However, any other join algorithm could be used. If evaluate determines that the rule r provides a new fact that can be added to I, it adds the fact, and all waiting threads are notified that a new fact has been added (the purpose of this is described below).

Once all facts in I have been evaluated, i.e. $facts_I.next=\varepsilon$, infer increments W as it is now waiting (line 7), and as it is entering a critical section it acquires a mutex m. It then waits to be notified by any other threads that they have added any more facts to I, in which case it decrements W (line 17), releases the mutex m (line 18), and resumes operation on the new facts (line 19 looping back to line 1). If, on the other hand, all threads are waiting (W=N in line 10), it cannot be the case that any more facts will be added to I (as all threads have added all possible facts). The thread that encounters this situation sets run to false (line 11), indicating to all other threads that the materialisation process has completed. It then notifies all other threads of the change (line 12). (The other threads will be waiting at line 14 of the infer procedure.) All threads will then, as run=false, exit the infer procedure (line 1 of infer). I is returned as the materialisation of P on (the original database instance) I.

Procedure 1 - infer

```
1:   while run do
2:     while F := facts_I.next and F ≠ ε do
3:       for all (r,π,σ) ∈ P.rulesFor(F) do
4:         evaluate(r, π, F, σ, 2)
5:       end for
6:     end while
7:     increment W atomically
8:     acquire m
9:       while facts_I.hasNext = false and run do
10:        if W = N then
11:          run := false
12:          notify all waiting threads
13:        else
14:          release m, wait for notification, acquire m
15:        end if
16:      end while
17:      decrement W atomically
18:    release m
19:  end while
```

The procedure evaluate is now described, with reference to Procedure 2. The procedure evaluate is a recursive procedure (i.e. it calls itself). The procedure takes a rule r, permutation $\pi$, fact F, substitution $\sigma$, and index j. When called by infer, the rule r is the rule to be matched, the permutation $\pi$ is the permutation of the body atoms of r, the fact F is the fact currently being considered, the substitution $\sigma$ is the substitution for the matched atoms of r, and j is the index of the permutation n to be considered (and is initially set as 2 by infer, as the first atom has effectively been considered by P.rulesFor).

If j is greater than len(r) (the number of body atoms in r), this indicates that all body atoms have been successfully considered, and so the appropriate fact is added to I (line 21). This fact is $h(r)\sigma$, the head atom of the rule r with variables substituted by constants as defined by $\sigma$. ($\sigma$ must substitute all variables in h with constants, as every variable in h must occurs in a body atom $b_i$, and I.match would not have returned $\sigma$ unless it substituted all variable in $b_i$ with constants.)

If j is not greater than the number of body atoms of r, the iterator it of substitutions matching body atom $b_{\pi(j)}(r)\sigma$ with F is obtained, for facts in $I^{<=F}$ if the permuted index $\pi(j)$ is bigger than the first permuted index $\pi(1)$, and for facts in $I^{<F}$ otherwise (line 24). The procedure evaluate is then recursively called for the next index of the permutation $\pi$, for each substitution $\tau$ from it, with the combination of the current substitution $\sigma$ and new substitution $\tau$ (line 27).

Thus, it can be seen that the procedure evaluate moves through the body atoms of the rule r, considering every possible valid substitution and adding the consequence of any matched rule when found.

Importantly, I.match is only ever called with facts returned by facts$_I$.next, and so the ordering of facts F does not need to be predetermined, but can be determined on the fly as the next fact is requested. In other words, factsI.next can simply return any fact F not previously returned, and this determines the position of F in the ordering <; as the ordering < is not predetermined, nothing needs to be done to ensure that a fact returned by factsI.next can be safely returned as the "next", and I.match will always have sufficient knowledge of the ordering < (i.e. when called with a fact F it will know the identity of all the facts F'<F it requires in order to operate, and it will know that for any other facts F" not yet returned it must be the case that F<F").

| Procedure 2 - evaluate |
| --- |
| 20: if j > len(r) then |
| 21: I.add(h(r)σ) |
| 22: if W > 0 then notify all waiting threads |
| 23: else |
| 24: it := I.match(b$_{m(j)}$(r)σ, π(j) > π(1), F) |
| 25: while it.hasNext do |
| 26: τ := it.next |
| 27: evaluate(r, π, F, σ∪τ, j + 1) |
| 28: end while |
| 29: end if |

There is now described a method of storing data in computer memory in accordance with another first embodiment of the invention. The method reduces interference of concurrent updates, but also efficiently enumerates matches to RDF atoms.

Figure 2:
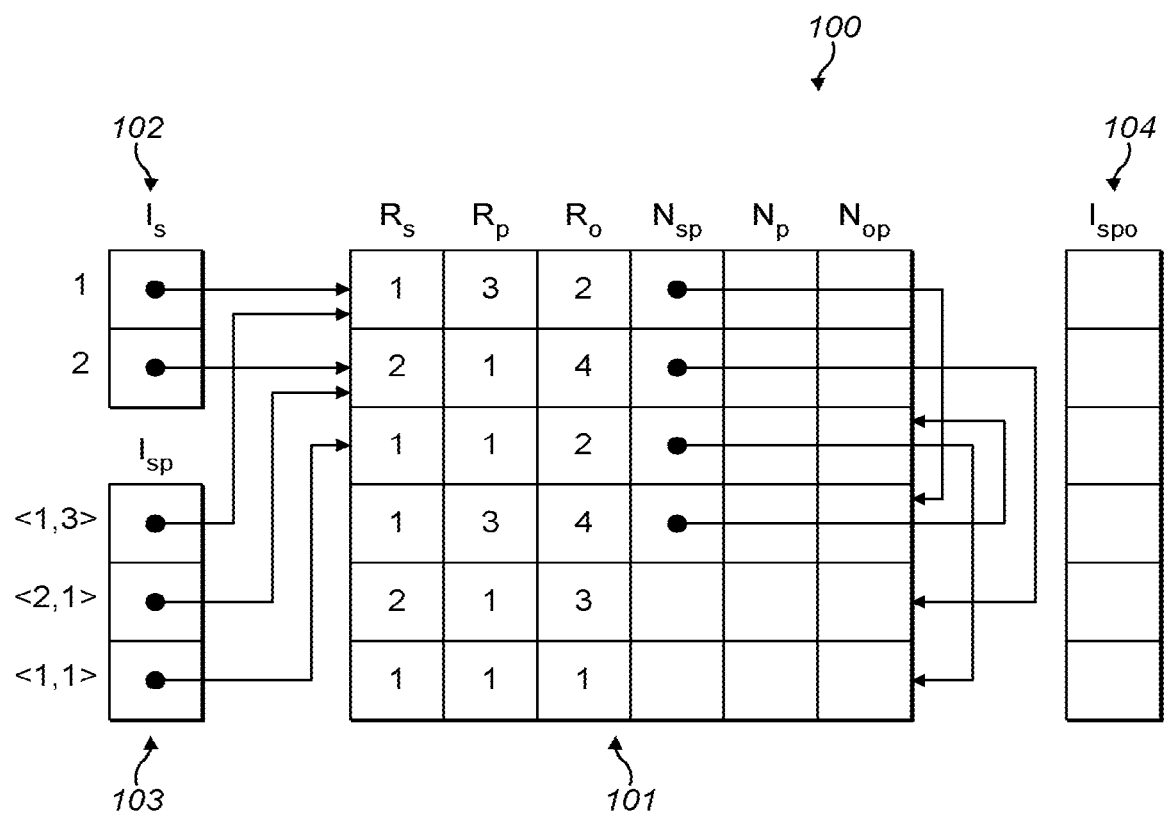
FIG. 2 is a schematic diagram of a data structure for storing data in a computer memory, in accordance with another embodiment of the invention.

A data structure 100 used by the method is partially shown in FIG. 2. The data structure records the triples of the database instance I in a six-column triple table 101. The data structure 100 also comprises indexes $I_s$ 102, $I_{sp}$ 103, and $I_{spo}$ 104.

The resources used by the database instance I, i.e. the items that are used as subjects and objects of triples, and the relations that are used as predicates of triples, are mapped to integers. The mapping is recorded as a lookup dictionary.

For each triple, the subject, predicate and object are stored (as integers) in columns $R_s$, $R_p$ and $R_o$ respectively. Further, each triple participates in three linked lists, an sp-list, p-list and op-list. To implement these lists, a pointer to the next item in each of the lists is stored in the columns $N_{sp}$, $N_p$ and $N_{op}$ respectively.

For each distinct subject occurring in the triple table 101, the sp-list connects all triples with that subject, grouped (but not necessarily sorted) by their predicate. For example, in FIG. 1 there is an sp-list consisting of triples <1, 3, 2>, <1, 3, 4>, <1, 1, 2> and <1, 1, 1>, containing sp-groups <1, 3> and <1, 1>. There is also an sp-list consisting of triples <2, 1, 4> and <2, 1, 3>, which are in the same sp-group <2, 1>.

To allow efficient access to the triples in the triple table 101, the index $I_s$ 102 associates each subject s with the head (i.e. first triple) $I_s[s]$ of the corresponding sp-list. $I_s$ 102 is implemented as an array indexed by subjects. To match an RDF atom of the form <s, x, y> (i.e. the subject in the atom is the constant s, but the predicate and object are variables), $I_s[s]$ is looked up and then the entire linked list is traversed. (If x=y then any triples which do not have the same predicate and object can simply be skipped over.) Further, the index $I_{sp}$ 103 associates each sp-group <s, p> with its first triple $I_{sp}[s, p]$. $I_{sp}$ 103 is implemented as a hash table. In order to reduce the memory required, each bucket of $I_{sp}$ 103 stores only a pointer to the first triple of the group, as the bucket's key (i.e. the corresponding pair <s, p>) can be retrieved from the triple table 101. To match an atom of the form <s, p, x> (i.e. the subject and predicate in the atom are the constants s and p respectively, but the object is a variable), $I_{sp}[s, p]$ is looked up, and the linked list is traversed until a triple with a predicate other than p is reached, or the linked list ends.

Further, the index $I_{spo}$ 104 provides an index for all triples, allowing atoms of the form <s, p, o> (i.e. atoms where the subject, predicate and object in the atom are the constants s, p and o respectively) to be efficiently matched. $I_{spo}$ 104 is implemented as a hash table, and similarly to $I_{sp}$ 103 each bucket of $I_{spo}$ can store only a pointer to the corresponding triple.

In addition to the triple table 101 and associated indexes 102 to 104, the data structure 100 comprises op-lists and associated indexes $I_o$ and $I_{op}$, and p-lists and associated index $I_p$ (not shown in FIG. 2). The op-lists connect all triples with object o, grouped by predicate p. The index $I_o$ associates each object o with the head $I_o[o]$ of the corresponding op-list. The index $I_{op}$ associates each op-group <o, p> with its first triple $I_{op}[o, p]$. Similarly to above, $I_o$ is implemented as an array indexed by objects and $I_{op}$ is implemented as a hash table, and they are used to match atoms of the form <x, y, o> and <x, p, o> respectively. The p-lists connect all triples with the same predicate (without any further grouping). The index $I_p$ associates each predicate p with the head $I_p[p]$ of the corresponding p-list, is implemented as an array indexed by predicates, and is used to match atoms of the form <x, p, y>.

To look up atoms of the form <s, x, o>, either $I_s[s]$ is looked up, and triples whose object is different from o are skipped over; or $I_o[o]$ is looked up, and triple whose subject is different from s are skipped over. In order to determined which index should be used, with each entry in $I_s$ and $I_o$ is recorded the number of items in the lists $I_s[s]$ and $I_o[o]$ respectively, and the index with the smaller number of items is used.

Finally, atoms of the form <x, y, z> (i.e. for which each of the subject, predicate and object are variables) can be matched by iterating over the triple table 101, as in this case every triple in the triple table 101 is matched. (Unless two or more of the variables are the same, in which case any triples in the triple table 101 for which the corresponding constants are not the same are skipped over.)

In alternative embodiments other indexes can be used, for example others of the six indexes of the form $I_{xy}$ that associate pairs of properties of triples with triples in the triple table 101. Further indexes will increase the speed at which triples can be looked up in the triple table, but at the expense of increased memory consumption.

Each triple in the triple table 101 also has a status flag (not shown in FIG. 2), which is used to indicate whether a triple has been added to all the relevant indexes.

Using the data structure 100, I.match(A, L, F) is implemented by identifying all matches for A as described above, but with any triples occurring in the triple table 101 (i.e. which come after F in the ordering <) being skipped over (which can be easily determined by a comparison of their pointers).

Further, facts$_I$ keeps an index into the triple table 101, but returns only facts which are fully committed, in other words for which the status flag has been set to indicate that they have been included in all relevant indexes. This allows facts to be added to the triple table 101 without the triple table 101 and all relevant indexes having to be locked. No concurrency issues will arise, as when a fact F is returned by facts$_I$ when requested by the infer procedure, in addition to F only facts F'<F will be considered by the infer procedure, and these must all have already been fully committed. This means, in particular, that no facts can fail to be derived due to a required fact not being available in the triple table or indexes when queried.

The insertion of triples into the triple table 101, as performed by I.add(F), is now described. The procedure insert-triple that performs the insertion is shown in Procedure 3. In the procedure, $I_{spo}$.buckets is the array of buckets of the $I_{spo}$ index, and |$I_{spo}$.buckets| is the length of that array. The procedure takes as input the subject s, predicate p and object o of a triple <s, p, o>.

First, the hash code for the triple and the first bucket index are determined (line 1). If necessary, the hash table is resized as described in detail below (line 3). The buckets are then scanned iteratively (lines 4 to 11). For each bucket, the triple stored in the bucket is retrieved (line 6). If the bucket contains the triple to be stored the procedure is stopped (line 9), as in this case the triple does not need to be (and should not be) added to I. If the bucket is empty (i.e. its contents is null), the loop is exited (line 8). The empty bucket is then locked by temporarily storing in it a marker INS (line 12); other threads executing the procedure insert-triple then know that if they find a marker INS in a bucket they must wait until the bucket is unlocked by having the marker INS overwritten by a triple (lines 5 to 7). The bucket is then locked using the conventional compare-and-set operation CAS (line 12). (CAS(loc, exp, new) retrieves the value old stored at location loc; stores new into loc if old=exp; and returns old; modern hardware ensures these steps are performed atomically without interference from any concurrent operations in other threads.) If the CAS operation fails, i.e. the contents of the bucket is no longer null, the bucket is re-examined, as another thread could have just inserted the same triple. If the CAS operation succeeds, the triple is added to the triple table (line 13), and a pointer to the triple is added to the bucket (line 13), overwriting INS, and hence unlocking the bucket.

| Procedure 3 - insert-triple |
| --- |
| 1:     h := hash(s,p,o),    i := h & (|$I_{spo}$.buckets| − 1) |
| 2:     do |
| 3:         Handle resize if needed |
| 4:         loop |
| 5:            do |
| 6:               T := $I_{spo}$.buckets[i] |
| 7:            while T = INS |
| 8:            if T = null then break |
| 9:            if T.$R_s$ = s ∧ T.$R_p$ = p ∧ T.$R_o$ = o then stop |
| 10:            i := (i + 1) & (|$I_{spo}$.buckets| − 1) |
| 11:        end loop |
| 12:     while CAS($I_{spo}$.buckets[i],null,INS) ≠ null |
| 13:     Add a new triple $T_{new}$ = (s,p,o) to the triple table |
| 14:     $I_{spo}$.buckets[i] := $T_{new}$ |

When a new triple $T_{new}$ is added to the triple table 101, all the indexes must be updated. To update the index $I_{sp}$ 103, its buckets are scanned as in the steps of the procedure insert-triple. If a bucket is found containing a triple T, $T_{new}$ is added using the procedure insert-fp-list shown in Procedure 4. First, the triple $T_{next}$ that follows T in the sp-list is found (line 2), and made the next triple for $T_{new}$ (line 3). T.$N_{sp}$ is updated to T if it has not been updated by another thread (line 4); if it has been updated, the entire procedure is simply repeated. This allows the new triple $T_{new}$ to be inserted without any locking being required.

| Procedure 4 - insert-fp-list |
| --- |
| 1:                  do |
| 2:                         $T_{next}$ := T.$N_{sp}$ |
| 3:                         $T_{new}$.$N_{sp}$ := $T_{next}$ |
| 4:                  while CAS(T.$N_{sp}$,$T_{next}$,$T_{new}$) ≠ $T_{next}$ |

If the index $I_{sp}$ does not contain a bucket for the given sp-group, $T_{new}$ is added to the bucket and made the head of the bucket in the index $I_s$ 102. This requires two CAS operations, and local locking; in other words, INS is stored into the bucket of $I_{sp}$, $I_s$ is updated using an analogous procedure to insert-fp-list, and then $T_{new}$ is stored in $I_{sp}$, unlocking the bucket.

$I_{sp}$ and $I_o$ are updated analogously to $I_{sp}$ and $I_s$, and $I_p$ is updated using an analogous procedure to insert-fp-list. Updates to $I_{spo}$, $I_{sp}$ and $I_s$, $I_{op}$ and $I_o$, and $I_p$ are independent (i.e. can be done concurrently without there being any interference between them).

Figure 3A:
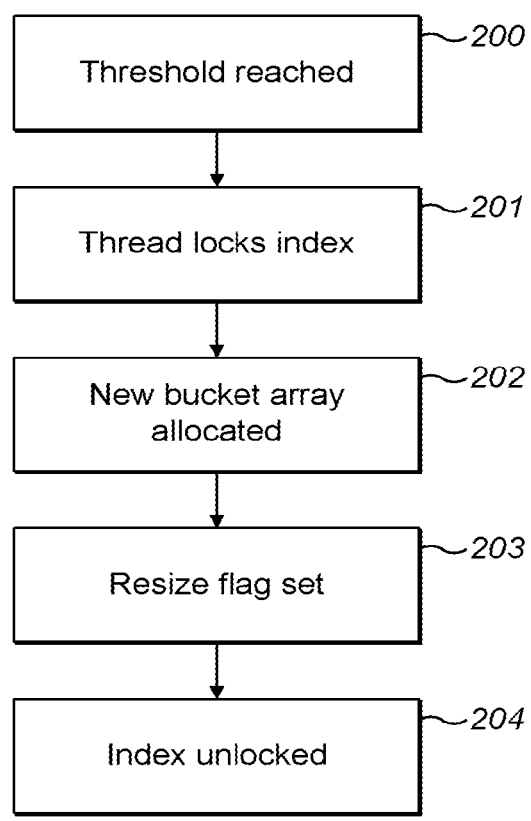
FIGS. 3a and 3b are flowcharts showing a method of resizing hash tables, in accordance with another embodiment of the invention.
Figure 3B:
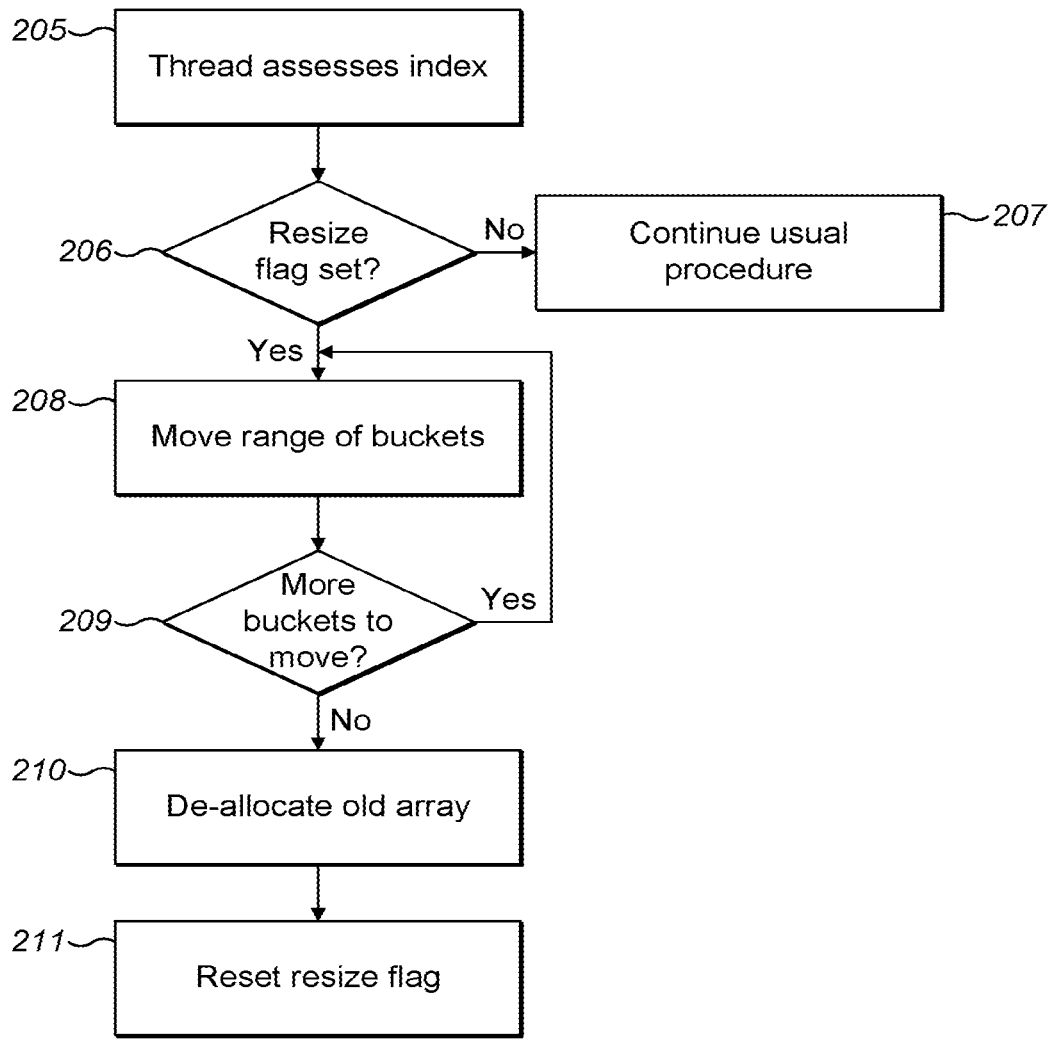

The method of resizing hash tables as may be performed in line 3 of procedure insert-triple is now described, with reference to the flowcharts of FIGS. 3*a* and 3*b*. The hash tables herein are implemented with open addressing. The threshold will conventionally be a percentage of used buckets, so 70% of buckets are used. (As is well-known, hash tables with open addressing conventionally store new entries in the next available free bucket after the bucket pointed to by the hash of a new entry. As a hash table fills up, the distance to the next available bucket increases, reducing performance. By doubling the size of the hash table after the threshold is met, performance is improved while avoiding the hash table being significantly larger than is required to store the entries it contains.)

As shown in FIG. 3*a*, once the threshold is reached (step 200), a single thread temporarily locks the entire index (step 201), allocates a new bucket array (step 202), sets a flag indicating that resizing is in progress (step 203), and unlocks the index (step 203). Subsequently, as shown in FIG. 3*b*, whenever a thread tries to access the index (step 205) but sees from the flag that resizing is in progress (step 206), it extract a range of buckets from the old array, say 1024 buckets (step 207), and transfers them to the new array. (If the resize flag is not set it continues with its usual procedure (step 207).) The transfer can be done without any locking being required, as during resizing no new entries will need to be added to the triple table 101. The process is repeated until all buckets have been transferred (step 209), and the thread that moves the final buckets then de-allocates the old array (step 210) and resets the resize flag (step 211).

In an embodiment of the invention, to avoid interference between threads each thread is provided with a proxy that provides a thread with "private" insertion points for the insertion of triples. This avoids interference due to the threads all adding triples to the end of the triple table 101, and triples being added after the first triple in an sp- or op-group, which requires updating of the next-pointer of the first triple.

Each proxy reserves a range of space in the triple table 101, so that different threads write to different areas of the triple table 101. This allows the locking of buckets of $I_{spo}$ 104 in the procedure insert-triple to be avoided, because as the space for a new triple is reserved for a particular thread before the triple is inserted, the insertion can be done before the index $I_{spo}$ 104 is updated. If when $I_{spo}$ 104 is updated it is seen that the index already contains the triple, it can simply be removed from the triple table.

Further, each proxy keeps a local copy of the indexes $I_{sp}$ 103 and $I_{op}$, to maintain its own insertion points in the sp- and op-lists. To insert a new triple $T_{new}$, the proxy first queries the local $I_{sp}$ index for the relevant sp-group. If there is no match, it is inserted into the global indexes as described above, and is also stored in the local $I_{sp}$ index. If on the other hand the local index $I_{sp}$ contains a triple T for the sp-group, $T_{new}$ is added after T; as the index is local to the thread, this can be done without requiring a CAS operation. This ensures threads write to different memory locations, and also reduces the number of CAS operations required. The local $I_{op}$ index is maintained analogously.

As maintaining local indexes is an overhead, each proxy counts the number of triples it has encounters for each subject and object, and uses local indexes only where a threshold of triples (say 100 triples) is exceeded.

The use of proxies results in the complication that $facts_I$ will eventually point to a location in a reserved range that does not yet contain a triple. If this occurs the location cannot simply be skipped over by $facts_I$, as a later insertion of a triple into the location by a proxy would result in the I.match procedure failing to operate correctly. To solve this problem, when it is detected that $facts_I$ points to an unused location, all unused location are marked as unused, and subsequently all new triples are added to the end of the triple table without proxies being used. This typically occurs only very late in the materialisation process, and is a final phase typically taking less than 1% of the overall time, so the reduction in efficiency due to no longer using proxies in negligible.

An embodiment of the invention in which the database being materialised incorporates the equality predicate owl:sameAs is now described. The embodiment uses a procedure similar to the infer procedure described above. However, in addition a mapping ρ of constants to constants is maintained; this maps a constant to a constant with which it is equal, and which is the selected representative for all such equal constants. A fact F is "outdated" if ρ(F) is not equal to F, and similarly for a rule R, where the substitution is applied to facts and rules by substituting the constants they contain. Further, the procedures use a queue of rules; R.enqueue(r) adds the rule r to the queue, and R.dequeue obtains a rule from the queue. Finally, the set of facts $facts_I$ is provided with a status marker for each fact it contains, which is used to mark a fact as outdated; $facts_I$.mark(F) applies the marker to the fact F. A queue of constants C is also used to which constants can be queued and dequeued in a corresponding manner is also used.

In each main loop of execution, the materialisation procedure can perform one of three actions, which are as follows.

The first procedure is to process a fact from the set of facts $facts_I$, similarly to the previous embodiment. The procedure applyRules that performs this is shown in Procedure 5. (Note that $facts_I$ is denoted T in following procedures.) However, before a fact F is processed it is checked whether it is marked as outdated. If it is not marked, the constant mapping is applied to F, and if this shows that F is outdated it is marked as such, and the updated fact with the mapping applied is added to the set of facts $facts_I$, and all threads are notified that there has been a change to the set of facts. The operation of the constant mapping is described later below.

If F is not outdated, if it is of the form <a, owl:sameAs, b> then if a and b are distinct then the minimum of the two is selected as the representative for the other. (Any arbitrary total ordering of the constants can be used to determine the minimum and maximum.) The substitution for the other is merged into the mapping using a procedure ρ.mergeInto which is also described later below, and the other is added to the queue of constants C. As it is always the minimum constant that is chosen as the representative, and it has been determined that F is not outdated, the representative will always be a representative that has been chosen on a past occasion, or a newly chosen representative for a set of equal constants the members of which are being substituted for the first time.

If F is of the form <a, owl:differentFrom, a> then the set of rules must be internally contradictory, and so this is notified to all threads.

Finally, when F is of any other form it is evaluated similarly to the previous embodiment. In addition, the reflexive fact <c, owl:sameAs, c> is added to the set of facts $facts_I$ for each constant c in F.

| Procedure 5 - applyRules |
| --- |
| 1:    F := T.next |
| 2:    if F ≠ ε and F is not marked as outdated then |
| 3:       G := ρ(F) |
| 4:       if F ≠ G then |
| 5:          if T.mark(F) and T.add(G) then notify all waiting threads |
| 6:       else if F is of the form (a,owl:sameAs,b) then |
| 7:          if a and b are distinct then |
| 8:             c := min{a,b}; d := max{a,b} |
| 9:             if ρ.mergeInto(d,c) then C.enqueue(d) and notify all waiting threads |
| 10:      else if F is of the form (a,owl:differentFrom,a) then |
| 11:         derive a contradiction and notify all waiting threads |
| 12:      else |
| 13:         for each (r,Q,σ) ∈ P'.rules(F) and each τ ∈ T.evaluate(Q,F,σ) do |
| 14:            if T.add(h(r)τ) then notify all waiting threads |
| 15:         for each resource c occurring in F do |
| 16:            if T.add((c,owl:sameAs,c)) then notify all waiting threads |
| 17:    return F ≠ ε |

The second procedure is to evaluate any queued rules by evaluating their bodies and then adding their heads to the set of facts $facts_I$. The queued rules are rules that have been updated by the mapping, and so this procedure applies these updated rules to the facts in $facts_I$. (The process by which rules become queued is described later below.) The procedure evaluateUpdatedRules that performs this is shown in Procedure 6. It will be appreciated that due to the parallel nature of the overall materialisation procedure, an instantiated head that is added to $facts_I$ may be outdated. This is why outdated facts in $facts_I$ are marked as such rather than being deleted, to prevent outdated facts that have been removed being reintroduced and consequently needing to be checked again to determine if they are outdated.

| Procedure 6 - evaluateUpdatedRules |
| --- |
| 1:    r := R.dequeue |
| 2:    if r ≠ ε then |
| 3:       for each τ ∈ T.evaluate(b(r)≤,L,∅) do |
| 4:          if T.add(h(r)τ) then notify all waiting threads |
| 5:    return r ≠ ε |

The third procedure is to rewrite the facts in $facts_I$ using any newly substituted constants, which as described above are queued in the queue C when their substitution is added to the mapping ρ. The procedure rewriteFacts that performs this is shown in Procedure 7. Only facts that are not marked as outdated are rewritten; a fact marked outdated does need to be rewritten because applyRules adds its rewritten version to facts$_I$ at the same time as marking it as outdated.

| Procedure 7 - rewriteFacts |
| --- |
| 1:   c := C.dequeue |
| 2:   if c ≠ ε then |
| 3:       for each unmarked fact F ∈ T that contains c do |
| 4:           if T.mark(F) and T.add(ρ(F)) then notify all waiting threads |
| 5:   return c ≠ ε |

The three procedures above are performed until there is no more work that they can do. This is shown below in the overall procedure materialise, shown in Procedure 9. Once they are all waiting, the updated version ρ(r) of each outdated rule r in the program is added to the queue R of updated rules, and each rule in the program itself is also updated. If no rules are added to the queue, which is determined by R.isEmpty, the materialisation has completed and the run flag is set accordingly to signal termination. Otherwise, the main loop of execution is repeated by performing again the procedures applyRules, evaluateUpdatedRules and rewriteFacts.

| Procedure 8 - materialise |
| --- |
| 1:   while run do |
| 2:     if ¬evaluateUpdatedRules( ) and ¬rewriteFacts( ) and ¬applyRules( ) then |
| 3:         increment W atomically |
| 4:         acquire m |
| 5:         while R.isEmpty and C.isEmpty and ¬T.hasNext and run do |
| 6:             if W = N then |
| 7:                 for each r ∈ P' such that r ≠ ρ(r) and ρ(r) ∉ P' ∪ R do |
| 8:                   R.enqueue(ρ(r)) |
| 9:                 L := T.last |
| 10:               P' := ρ(P) |
| 11:               run := R.isEmpty |
| 12:               notify all waiting threads |
| 13:             else |
| 14:               release m, wait for notification, acquire m |
| 15:         decrement W atomically |
| 16:         release m |

The implementation of the mapping of constants is now described. The mapping ρ is implemented using arrays rep$_\rho$ and next$_\rho$ which are indexed by constants and initialised with zeros. rep$_\rho$[c] is zero if c represents itself, otherwise rep$_\rho$[c] is the resource that is the representative for c. next$_\rho$ defines a linked list of constants that are equal, where next$_\rho$[c] is a pointer to the next constant in the list.

The procedure ρ(c) to substitute a constant with its representative is shown in Procedure 9. The substitution of constants in facts and rules is then performed in the corresponding manner. rep$_\rho$ is traversed until a non-merged constant is found, which is then returned. If another thread updates ρ by updating rep$_\rho$[r], scanning of rep$_\rho$ continues past r, so that the result is at least as current as ρ was when the procedure was begun.

| Procedure 9 - ρ(c) |
| --- |
| 1:                 r := c |
| 2:                 loop |
| 3:                       r' := rep$_\rho$[r] |
| 4:                       if r' = 0 then |
| 5:                           return r |
| 6:                       else |
| 7:                           r := r' |

The procedure ρ.mergeInto(d,c) to update the mapping so that d is substituted with c is shown in Procedure 10. The procedure uses a compare-and-set primitive CAS that prevents thread interference; CAS(loc, exp, new) atomically loads the value stored at location loc into a temporary variable old, stores new into loc if old=exp, and returns old.

In the procedure, first rep$_\rho$ is updated to indicate that d should be replaced with c. If this update is successful, the variable e scans the linked list for the constants replaced by c until the end of the list is found; this is done by the while statement, which is evaluated lazily so that the latter statement CAS(next$_\rho$[e], 0, d) is not evaluated to see if it does not equal 0 as long as the former statement next$_\rho$[e] does not equal 0. Once the end of the linked list for c is found, it is updated to point to d; if this update is not successful (due to concurrent updates meaning it e is no longer the end of the list, and consequently it is not equal to zero), the constant e returns to scanning for the end of the list.

| Procedure 10 - ρ.mergeInto(d,c) |
| --- |
| 1:   if CAS(rep$_\rho$[d],0,c) = 0 then |
| 2:       e := c |
| 3:       while next$_\rho$[e] ≠ 0 or CAS(next$_\rho$[e],0,d) ≠ 0 do |
| 4:           e := next$_\rho$[e] |
| 5:       return true |
| 6:   else |
| 7:       return false |

An embodiment of the invention also provides a method of answering SPARQL queries on materialised databases that include facts that have been rewritten in accordance with the previous embodiment. SPARQL (SPARQL Protocol and RDF Query Language) is a database query language for RDF databases somewhat similar to the SQL query language for relational databases.

Given a set of facts T and a mapping ρ, a query Q could be answered by expanding the set of facts T using the mapping ρ, but this would be very inefficient. Alternatively, the mapping ρ could be applied to the query Q, and then the answer could be expanded. However, this would not always give the correct answer, for two reasons.

The first reason is due to the "bag" semantics of SPARQL, for which repeated answers matter. For example, in a set of facts:
<Obama, presidentOf, USA>, <Obama, presidentOf, US>, <USA, owl:sameAs, US>
the query:
SELECT ?x WHERE {?x presidentOf ?y}
will return the result:
{?→Obama}, {?x→Obama}.
In other words, the answer is repeated, once for the fact <Obama, presidentOf, USA> and once for the fact <Obama, presidentOf, US>. However, as these constants are equal, in a database materialised according to the above embodiment only one of the facts would appear. As a result, if the mapping were applied to the query, the answer on the materialised database would not be repeated, nor would it be once expanded.

To solve this problem, the expansion is adapted so that for each variable used in the query, the set of answers for that variable is duplicated where another variable has as an answer a constant that is a representative of a set of equal constants. Thus, duplicated answers are returned as required.

The second reason is due to built-in functions of SPARQL. For example, if the database includes the additional fact <USPresident, presidentOf, US>, then evaluating the query:

SELECT ?y WHERE {?x presidentOf US.BIND(STR(?y) AS ?x} will return on the expanded materialised database the result: {?y→Obama} and {?y→USPresident}.

However, the mapped query applied to the unexpanded materialised database will only return {?y→Obama}, as the strings Obama and USPresident are not equal, and the subsequent expansion will not provide the missing answer.

To solve this problem, the answers are expanded before any built-in functions are evaluated; after evaluation the answers are again expanded, however without the answers now being duplicated as the required duplication has already been provided by the initial expansion.

Whilst the present invention has been described and illustrated with reference to particular embodiments, it will be appreciated by those of ordinary skill in the art that the invention lends itself to many different variations not specifically illustrated herein.

The invention claimed is:

1. A computer-implemented method, performed by a computer system, the computer system including i) a logical database that stores a set of logical facts and at least one index that includes one or more buckets that store, as a key, a pointer to a linked list for locating a logical fact in the set of logical facts, and ii) a plurality of parallel processing threads, wherein each of the plurality of parallel processing threads has an associated reserved area in the logical database for adding a new logical fact to the set of logical facts, the method including updating, by the computer system, the logical database and the at least one index by controlling each respective thread of the plurality of parallel processing threads of the computer system to perform steps comprising:
   receiving a new logical fact to be added to the logical database;
   adding the new logical fact only to the respective thread's associated reserved area in the logical database without locking associated reserved areas of other threads of the plurality of parallel processing threads;
   performing an index update process to update the at least one index with a pointer to the respective thread's new logical fact, the index update process including:
      permitting each respective thread of the plurality of parallel processing threads to simultaneously access the at least one index to identify a respective bucket to store the pointer to the respective thread's new logical fact;
      adding the pointer to the respective thread's new logical fact to the linked list associated with the key stored in the respective bucket by performing a local compare-and-set operation that permits the respective thread to lock and update the respective bucket; and
   setting a status flag for the respective thread to indicate whether the at least one index has been successfully updated to include the pointer to the respective thread's new logical fact; and
   in a case where status flags of the plurality of parallel processing threads indicate that the at least one index has not been successfully updated by all threads of the plurality of parallel processing threads, repeating the index update process for each thread of the plurality of parallel processing threads whose status flag indicates that the at least one index has not been updated until the status flags indicate that the at least one index has been successfully updated by all threads of the plurality of parallel processing threads.

2. The method as claimed in claim 1,
   wherein each logical fact in the set of logical facts is stored in the logical database as a triple including a subject, a predicate, and an object, and the pointer to each logical fact is associated with a plurality of pointers to other logical facts that share one or more of a same subject, predicate, or object as the each logical fact, and
   wherein the at least one index includes, as keys, pointers to a first logical fact having one or more of a particular subject, predicate, or object.

3. The method as claimed in claim 1, wherein the step of receiving a new logical fact to be added to the logical database further includes:
   retrieving a logical fact from the set of logical facts, wherein the retrieved logical fact has not previously been retrieved by any thread; and
   applying at least one logical rule from a set of logical rules to the retrieved logical fact and any of the logical facts previously retrieved by any thread to derive a new logical fact.

4. The method as claimed in claim 1, wherein the step of receiving a new logical fact includes receiving the set of logical facts to initialise the logical database.

5. The method as claimed in claim 1,
   wherein the set of logical facts includes at least one logical fact incorporating an equality predicate indicating that two constants are equal, and a mapping of constants to representative constants is maintained, and
   wherein the method further includes the steps of:
      selecting a representative constant from the two constants;
      updating the mapping to map an other constant of the two constants to the representative constant; and
      rewriting logical facts in the set of logical facts using the mapping to replace occurrences of the other constant with the representative constant.

6. The method as claimed in claim 1, further including using the updated at least one index to query the updated logical database to retrieve one or more stored logical facts associated with the query.

7. The method as claimed in claim 1, wherein adding the pointer to the respective thread's new logical fact to the linked list associated with the key stored in the respective bucket further includes:
   in a case where the respective bucket is empty, storing the pointer to the respective thread's new logical fact as a head of a new linked list, and storing a pointer to the head of the new linked list as the key for the respective bucket; and
   in a case where the respective bucket is not empty, adding the pointer to the respective thread's new logical fact to the linked list associated with the key stored in the bucket.

8. A non-transitory computer readable storage configured to store a program that, when executed by a computer system including i) a logical database that stores a set of logical facts and at least one index that includes one or more buckets that store, as a key, a pointer to a linked list for locating a logical fact in the set of logical facts, and ii) a plurality of parallel processing threads, wherein each of the plurality of parallel processing threads has an associated reserved area in the logical database for adding a new logical fact to the set of logical facts, performs a computer-implemented method including updating, by the computer system, the logical database and the at least one index by controlling each respective thread of the plurality of parallel processing threads of the computer system to perform steps comprising:
   receiving a new logical fact to be added to the logical database;
   adding the new logical fact only to the respective thread's associated reserved area in the logical database without locking associated reserved areas of other threads of the plurality of parallel processing threads;
   performing an index update process to update the at least one index with a pointer to the respective thread's new logical fact, the index update process including:
      permitting each respective thread of the plurality of parallel processing threads to simultaneously access the at least one index to identify a respective bucket to store the pointer to the respective thread's new logical fact;
      adding the pointer to the respective thread's new logical fact to the linked list associated with the key stored in the respective bucket by performing a local compare-and-set operation that permits the respective thread to lock and update the respective bucket; and
      setting a status flag for the respective thread to indicate whether the at least one index has been successfully updated to include the pointer to the respective thread's new logical fact; and
   in a case where status flags of the plurality of parallel processing threads indicate that the at least one index has not been successfully updated by all threads of the plurality of parallel processing threads, repeating the index update process for each thread of the plurality of parallel processing threads whose status flag indicates that the at least one index has not been updated until the status flags indicate that the at least one index has been successfully updated by all threads of the plurality of parallel processing threads.

9. The storage as claimed in claim 8,
wherein each logical fact in the set of logical facts is stored in the logical database as a triple including a subject, a predicate, and an object, and the pointer to each logical fact is associated with a plurality of pointers to other logical facts that share one or more of a same subject, predicate, or object as the each logical fact, and
wherein the at least one index includes, as keys, pointers to a first logical fact having one or more of a particular subject, predicate, or object.

10. The storage as claimed in claim 8, wherein the step of receiving a new logical fact to be added to the logical database further includes:
   retrieving a logical fact from the set of logical facts, wherein the retrieved logical fact has not previously been retrieved by any thread; and
   applying at least one logical rule from a set of logical rules to the retrieved logical fact and any of the logical facts previously retrieved by any thread to derive a new logical fact.

11. The storage as claimed in claim 8, wherein the step of receiving a new logical fact includes receiving the set of logical facts to initialise the logical database.

12. The storage as claimed in claim 8,
wherein the set of logical facts includes at least one logical fact incorporating an equality predicate indicating that two constants are equal, and a mapping of constants to representative constants is maintained, and
wherein the method further includes the steps of:
   selecting a representative constant from the two constants;
   updating the mapping to map an other constant of the two constants to the representative constant; and
   rewriting logical facts in the set of logical facts using the mapping to replace occurrences of the other constant with the representative constant.

13. A computer system including:
a memory;
a logical database that stores a set of logical facts and at least one index that includes one or more buckets that store, as a key, a pointer to a linked list for locating a logical fact in the set of logical facts; and
a plurality of parallel processing threads configured to execute a program that performs a computer-implemented method to update, by the computer system, the logical database and the at least one index by controlling each respective thread,
wherein each of the plurality of parallel processing threads has an associated reserved area in the logical database for adding a new logical fact to the set of logical facts, and
wherein each respective thread of the plurality of parallel processing threads performs steps comprising:
   receiving a new logical fact to be added to the logical database;
   adding the new logical fact only to the respective thread's associated reserved area in the logical database without locking associated reserved areas of other threads of the plurality of parallel processing threads;
   performing an index update process to update the at least one index with a pointer to the respective thread's new logical fact, the index update process including:
      permitting each respective thread of the plurality of parallel processing threads to simultaneously access the at least one index to identify a respective bucket to store the pointer to the respective thread's new logical fact;
      adding the pointer to the respective thread's new logical fact to the linked list associated with the key stored in the respective bucket by performing a local compare-and-set operation that permits the respective thread to lock and update the respective bucket; and
      setting a status flag for the respective thread to indicate whether the at least one index has been successfully updated to include the pointer to the respective thread's new logical fact; and
   in a case where status flags of the plurality of parallel processing threads indicate that the at least one index has not been successfully updated by all threads of the plurality of parallel processing threads, repeating the index update process for each thread of the plurality of parallel processing threads whose status flag indicates that the at least one index has not been updated until the status flags indicate that the at least one index has been successfully updated by all threads of the plurality of parallel processing threads.

14. The system as claimed in claim 13,
wherein each logical fact in the set of logical facts is stored in the logical database as a triple including a subject, a predicate, and an object, and the pointer to each logical fact is associated with a plurality of pointers to other logical facts that share one or more of a same subject, predicate, or object as the each logical fact, and
wherein the at least one index includes, as keys, pointers to a first logical fact having one or more of a particular subject, predicate, or object.

15. The system as claimed in claim 13, wherein, in the step of receiving a new logical fact to be added to the logical database, the each respective thread further performs the steps of:
retrieving a logical fact from the set of logical facts, wherein the retrieved logical fact has not previously been retrieved by any thread; and
applying at least one logical rule from a set of logical rules to the retrieved logical fact and any of the logical facts previously retrieved by any thread to derive a new logical fact.

16. The system as claimed in claim 13, wherein, in the step of receiving a new logical fact, the each respective thread further performs the step of receiving a logical fact from the set of logical facts to initialise the logical database.

17. The system as claimed in claim 13,
wherein the set of logical facts includes at least one logical fact incorporating an equality predicate indicating that two constants are equal, and a mapping of constants to representative constants is maintained, and
wherein the each respective thread further performs the steps of:
selecting a representative constant from the two constants;
updating the mapping to map an other constant of the two constants to the representative constant; and
rewriting logical facts in the set of logical facts using the mapping to replace occurrences of the other constant with the representative constant.

* * * * *